Aug. 7, 1956    R. D. HAYWARD    2,757,563
POWER-OPERATED, GEAR-CONTROLLED, HOLLOW SHAFT WRENCHES
Filed Oct. 27, 1954    3 Sheets-Sheet 2

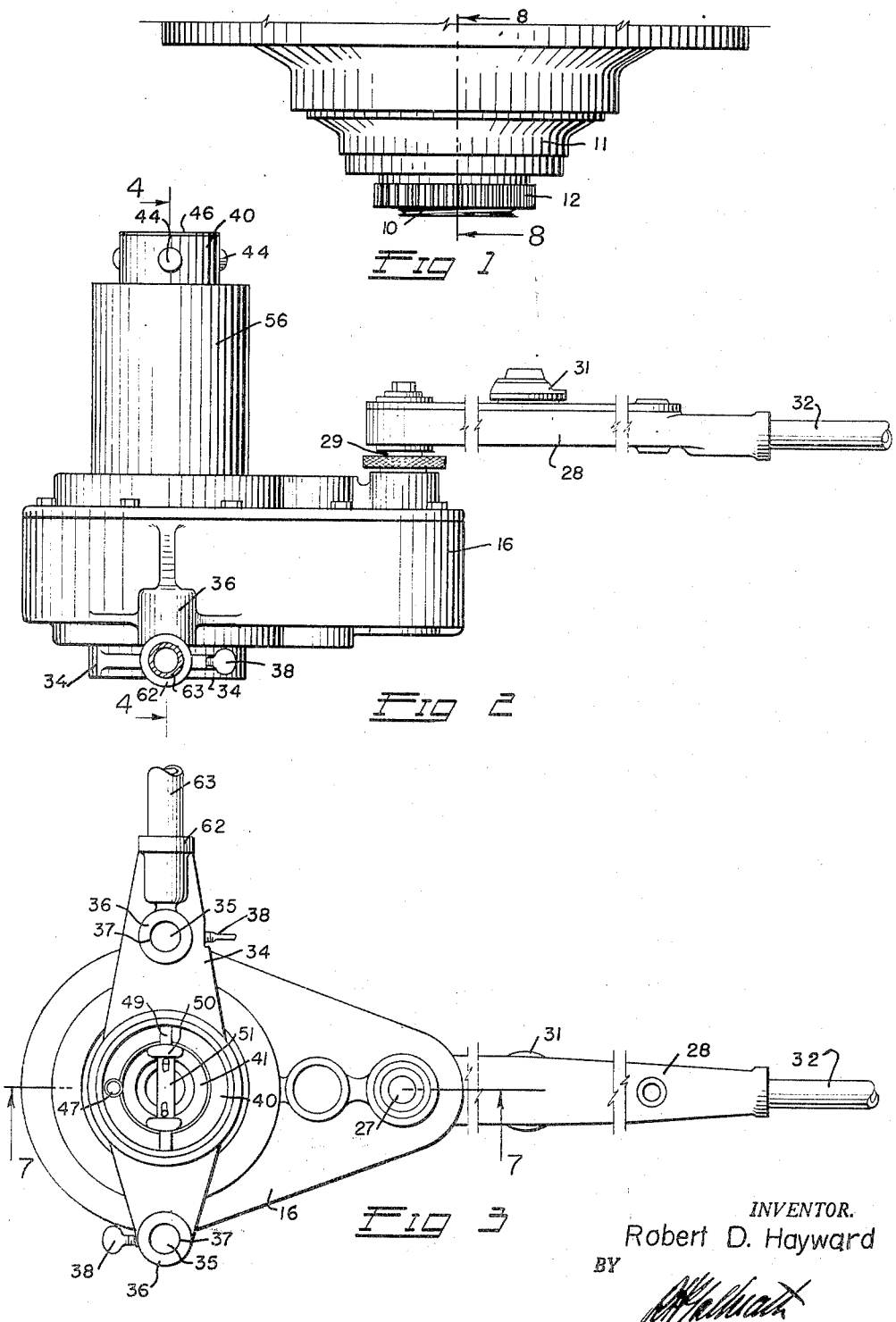

INVENTOR.
Robert D. Hayward
BY
ATTORNEY

Aug. 7, 1956 R. D. HAYWARD 2,757,563
POWER-OPERATED, GEAR-CONTROLLED, HOLLOW SHAFT WRENCHES
Filed Oct. 27, 1954 3 Sheets-Sheet 3
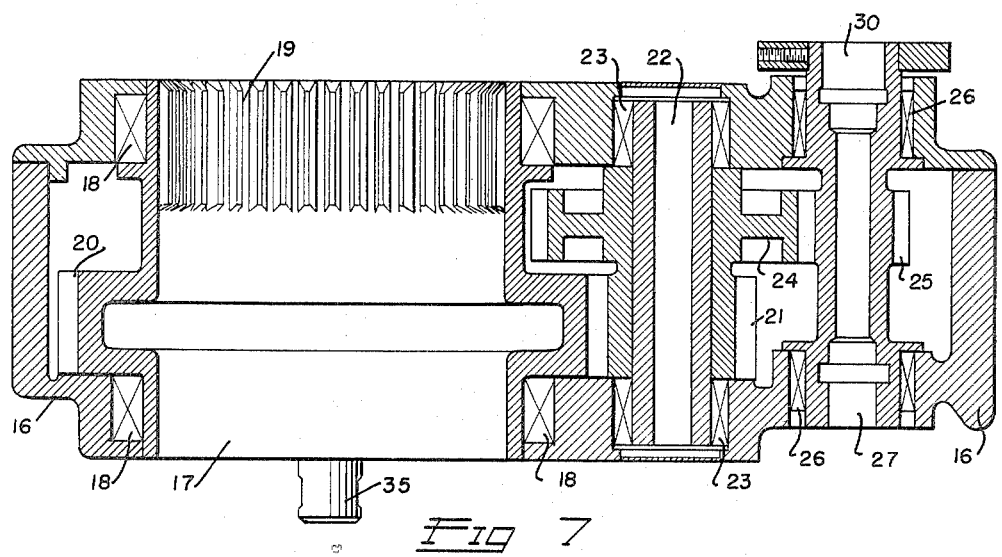
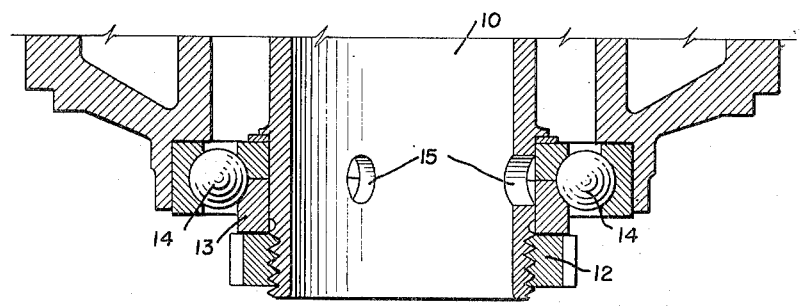
INVENTOR.
Robert D. Hayward
BY
ATTORNEY

United States Patent Office 2,757,563
Patented Aug. 7, 1956

2,757,563

POWER-OPERATED, GEAR-CONTROLLED, HOLLOW SHAFT WRENCHES

Robert D. Hayward, Denver, Colo., assignor to B. K. Sweeney Mfg. Co., Denver, Colo., a corporation of Colorado Application October 27, 1954, Serial No. 465,044

11 Claims. (Cl. 81—57)

This invention relates to a wrench, and particularly to a wrench for removing and replacing thrust nuts from hollow power shafts such as used in helicopters and similar aircraft. Such a nut must be placed upon the shaft with a predetermined torque designed to employ the full strength of the nut without placing undue and dangerous strains and stresses thereon.

The principal object of the invention is to provide a wrench which may be used for placing or removing a nut on the extremity of a hollow shaft, and which will transmit the reaction of the force applied to the nut to the shaft so as to tend to rotate the shaft in one direction while the nut is being rotated in the other direction.

Another object of the invention is to provide a wrench for use on the overhead main shaft thrust nut of a helicopter which will not require access to the exterior of the shaft and which when in place and while in use, will be self-supporting.

A further object is to provide a highly efficient adapter for hollow shaft terminal nut use which will adapt a conventional geared power wrench to this use.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the lower terminal extremity of a conventional helicopter main shaft and its bearing housing, illustrating the thrust nut to which this improved wrench is designed to be applied;

Fig. 2 is a side view of the improved hollow shaft adapter combined with gear and torque wrenches of types for which the adapter is adapted;

Fig. 3 is a bottom view of the combined wrenches and adapter;

Figure 4:
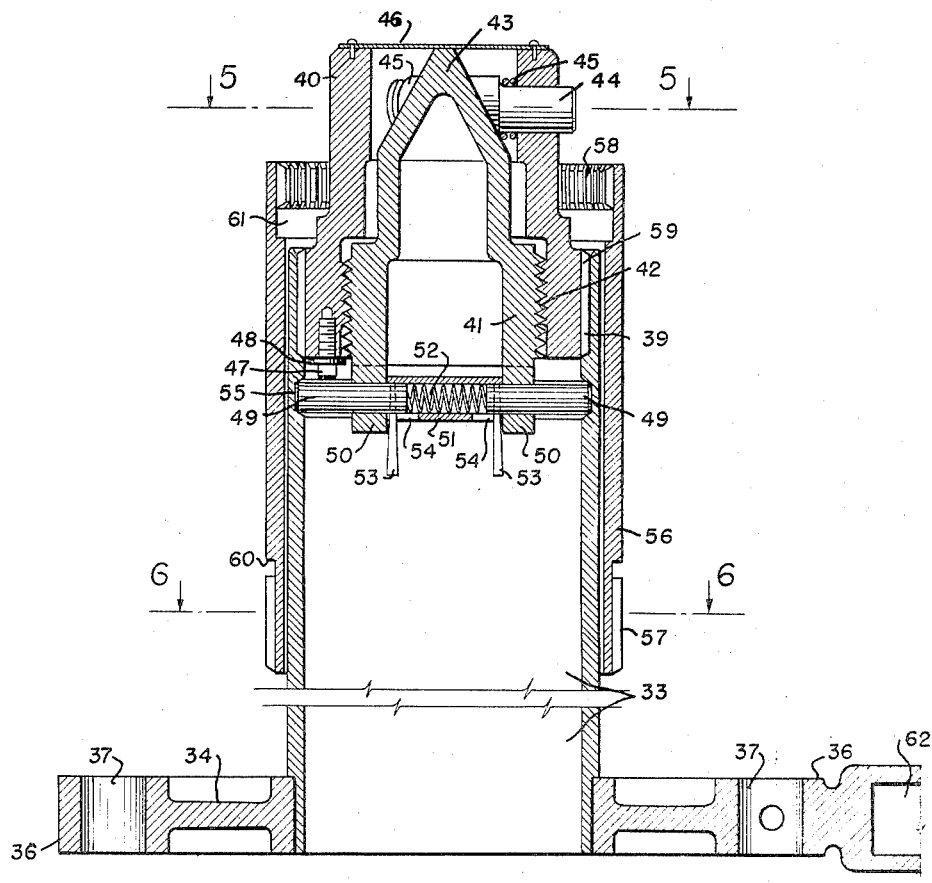
Fig. 4 is an enlarged, vertical section through the adapter removed from the wrench, taken on the line 4—4, Fig. 2.
Figures 5, 6:
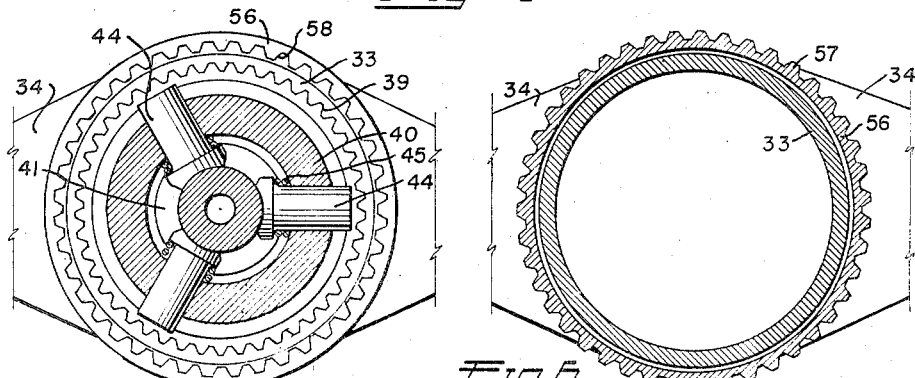

Figs. 5 and 6 are horizontal cross-sections through the adapter, taken on the lines 5—5 and 6—6, Fig. 4, respectively;

Fig. 7 is a longitudinal section through the gear wrench of Fig. 2, with the adapter and the torque wrench removed therefrom, taken on the line 7—7, Fig. 3; and Fig. 8 is a cross-section through the helicopter main shaft terminal extremity of Fig. 1, taken on the line 8—8, Fig. 1.

While the invention has been more particularly designed for use on the terminal nuts of helicopter power shafts, it will, of course, be useful for any similar shaft and nut application. For descriptive purposes, the invention will be described for application to the main thrust nut of the tubular vertical shaft of a conventional helicopter, such a shaft is indicated on the drawing at 10 and usually projects downwardly from a lower bearing housing 11. The lower extremity of the shaft is externally threaded to receive a fluted shaft terminal nut 12. The nut 12 retains internal ball races 13 of a conventional ball thrust bearing 14 against longitudinal movement on the shaft. The nut 12 is difficult to remove and replace due to the fact that it is an overhead position and difficult of access and to the fact that it is difficult to hold the shaft 10 against rotation.

This improved wrench and adapter is designed for removing the nut 12 and for replacing the conventional fluted nut 12 with a predetermined torque. The shaft 10 is provided for the use of this invention with a plurality of, preferably three, wrench openings 15 adjacent its lower extremity for receiving the improved wrench.

The wrench comprises, in the main, an adapter mechanism for adapting a power wrench for use on the shaft 10 and the nut 12. Such a power wrench comprises a gear housing 16 which for the uses of this invention is provided with two outwardly projecting anchor studs 35 anchored in stud bosses 36 on the housing. A hollow, cylindrical torque delivery shaft 17 is rotatably mounted in suitable bearings 18 in the housing 16 and is provided with internal splines 19 for receiving any desired nut adapter. The hollow delivery shaft 17 is driven by means of an external ring gear 20, affixed or formed thereon, which meshes with a first drive pinion 21 on a countershaft 22 which is mounted in the housing 16 upon suitable bearings 23. The countershaft 22 carries a countershaft gear 24 which meshes with the teeth of a second drive pinion 25 which is mounted or formed on a hollow wrench shaft 27, mounted in suitable bearings 26 in the housing 16, and to which torque may be applied by means of any suitable wrench device, such as a conventional torque wrench.

A conventional torque wrench is indicated on the drawing at 28 and is provided with a non-circular stud 29 which fits into a non-circular socket 30 in the wrench shaft 27 for rotating the latter. The torque wrench may be of any standard variety provided with a torque-indicating gauge 31 and an actuating lever or handle 32.

The mechanism as thus far described is more or less conventional. This invention relates to an adapter for adapting the above described power and torque wrenches for use on the shaft 10 and nut 12.

The adapter comprises an inner tube 33 designed to pass upwardly completely through the hollow shaft 17 of the power wrench and to project above and below the latter. That portion of the shaft 17 projecting below the barrel is fixedly mounted, such as by welding, in an anchor frame 34. The anchor frame extends across the bottom of the gear housing 16 and is provided with stud holes 37 for receiving the anchor studs 35 and upon which the anchor frame may be locked by means of suitable set screws 38. The anchor frame is also provided with a handle socket 62 for receiving a pipe handle 63.

The upper extremity of the inner tube 33 is provided with internal splines 39 for receiving the splined lower extremity of a tubular sleeve member 40, the upper portion of which is designed to enter the lower extremity of the tubular shaft 10.

A hollow core member 41, provided with a conical upper extremity 43, is threaded into the lower extremity of the sleeve member 40 on suitable threads 42. A plurality of locking pins 44, corresponding in number to the number of wrench openings 15, extend radially outward through the side wall adjacent the upper extremity of the sleeve member 40. The inner extremities of the locking pins 44 are constantly urged against the conical surface of the conical upper extremity 43 of the core member 41 by means of suitable compression springs 45. The upper extremity of the sleeve member 40 is closed, for protective purposes, by means of a cap plate 46. A stop screw 47 maintains a stop washer 48 in overlapping relation to the threads 42 to prevent the core member 41 from being completely unscrewed from the sleeve member 40.

Two locking shafts 49 project radially outwardly through downwardly projecting ears 50 on the lower extremity of the core member 41. The inner extremities of the locking shafts extend into a lock shaft aligning sleeve 51 positioned between the ears 50 and containing a compression spring 52 which acts to constantly urge the locking shafts outwardly. The locking shafts can be manually compressed toward each other by means of finger pins 53, one of which extends downwardly from the inner extremity of each locking shaft 49 and both of which extend through guide slots 54 formed in the sleeve 51. The outer extremities of the locking shafts 49 are slightly tapered and are positioned to engage an internal, circumferential locking groove 55 which is formed in the inner wall of the inner tube 33.

An outer tube 56 is adapted to fit about the inner tube 33. The lower extremity of the outer tube 56 is grooved to form external splines 57 and the upper extremities of the splines are cut-away to form a downwardly facing circumferential shoulder 60. The external splines 57 are designed to mesh with the internal splines 19 of the torque delivery shaft 17 of the power wrench. The upper extremity of the outer tube 56 is provided with internal splines 58 designed to engage and mesh with the flutes on the thrust nut 12. A clearance groove 61 is formed in the inner wall of the outer tube 56 below the splines 58, into which the nut 12 may move when unscrewed from the shaft 10, and the upper extremities of the splines 58 are slightly tapered.

*Operation*

The core member 41 is rotated counterclockwise in the sleeve member 40 until the threads 42 strike the stop washer 48 so that the conical upper extremity 43 will be lowered with relation to the locking pins 44 to allow the latter to move inwardly within the circumference of the sleeve 40. The sleeve 40 is now inserted in the lower extremity of the shaft 10 and the core member 41 is rotated slowly in a clockwise direction to tend to urge the pins 44 outwardly while the sleeve member 40 is slowly rotated within the shaft 10 until the pins 44 engage the openings 15. The core member 41 is now screwed fully into place to the position of Fig. 4 to project the pins 44 into the openings 15 so as to securely support the sleeve 40 and its core member 41 in place on the lower extremity of the shaft 10.

The anchor frame 34 is now locked onto the housing 16 by means of the set screws 38 so that the inner tube 33 will project concentrically through and upwardly from the torque delivery shaft 17. The outer tube 56 is now lowered over the inner tube 33 until the splines 57 mesh with the splines 19 of the delivery shaft 17 and until the shoulder 60 on the outer tube rests upon and is supported by the tubular delivery shaft 17.

The entire assembly of the power wrench, with the inner and outer tubes 33 and 56 in place, is now lifted upwardly over the downwardly protruding lower extremity of the sleeve member 40. The splines 39 are intermeshed as the inner tube moves upwardly over the sleeve, and the splines 58 are intermeshed with flutes on the thrust nut 12 as the outer tube 56 moves upwardly over the nut.

The tapered extremities of the locking shafts 49 engage the tapered extremities on the splines 58 so as to urge the locking shafts 49 inwardly as the inner tube 33 moves upwardly. The locking shafts 49 ride along the splines 39 in the inner tube until they reach the locking groove 55, at which time they will snap outwardly into the locking groove under the influence of the spring 52 so as to support the inner tube 33, and through it the entire gear housing 16 from the locking pins 44.

The torque wrench 28 is now applied to the wrench shaft 27 and the assembly is operated by gripping the pipe handle 63 in one hand and the torque wrench handle 32 in the other. It can be seen that actuation of the handle 32 will cause the delivery shaft 17 to rotate the outer tube 56, and that this rotation will be transmitted by the splines 58 to the nut 12 to rotate the latter in either desired direction. The reaction of the nut rotation will be transmitted from the gear housing 16 through the anchor frame 34 and thence through the inner tube 33, the sleeve member 40, and the locking pins 44 to the shaft 10 so that the tendency is to always rotate the shaft 10 in a direction opposite to the rotation of the nut 12. Shaft rotation may be resisted, however, by the hand on the pipe handle 63. After the nut 12 has been completely removed or completely replaced, as the case might be, the operator simply reaches through the hollow inner tube 33 and grips the pins 53 to force them toward each other. This allows the entire wrench assembly, including the outer tube 56, to be lowered from the sleeve member 40, thence by simply unscrewing the core member 41, to allow the locking pins 44 to retract, the entire sleeve member 40, with its contained core member 41, can be removed from the shaft 10.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for adapting a power wrench of the type having an internally splined torque delivery shaft rotatably mounted in a wrench housing for use in removing and replacing a terminal nut on and from a tubular shaft, comprising: an outer tube; means for fixedly connecting one extremity of said outer tube to said delivery shaft; means for connecting the other extremity of said outer tube to said terminal nut; an inner tube fixedly secured to said power wrench housing at its one extremity and extending into the outer tube at its other extremity; a sleeve member detachably mounted in said other extremity and adapted to project into said tubular shaft; and means for locking said sleeve member to said tubular shaft.

2. Means for adapting a power wrench of the type having an internally splined torque delivery shaft rotatably mounted in a wrench housing for use in removing and replacing a terminal nut on and from a tubular shaft as described in claim 1 in which the means for locking said sleeve member to said tubular shaft comprises: a core member longitudinally movable in said sleeve; a conical upper extremity on said core member; and radially projecting, slidable locking pins carried in the upper extremity of said sleeve and adapted to be engaged by said conical extremity when said core member is moved into said sleeve so as to force said pins radially outwardly into receiving openings in said shaft.

3. Means for adapting a power wrench of the type having an internally splined torque delivery shaft rotatably mounted in a wrench housing for use in removing and replacing a terminal nut on and from a tubular shaft as described in claim 2 having means for securing said sleeve in said inner tube comprising: external splines formed on said sleeve meshing with internal splines formed on said inner tube; and locking means acting to lock said splines in mesh.

4. Means for adapting a power wrench of the type having an internally splined torque delivery shaft rotatably mounted in a wrench housing for use in removing and replacing a terminal nut on and from a tubular shaft as described in claim 3 in which the locking means comprises: oppositely and radially projecting lock shaft slidably mounted in the lower extremity of said core member;

resilient means urging said lock shaft outwardly into engagement with receiving means in said inner tube; and means for compressing said resilient means to contract said locking shafts toward each other to release said sleeve from said inner tube.

5. Means for adapting a power wrench of the type having an internally splined torque delivery shaft rotatably mounted in a wrench housing for use in removing and replacing a terminal nut on and from a tubular shaft, comprising: an adapter frame; means securing said adapter frame to said wrench housing; an inner tube affixed to said adapter frame and projecting through said delivery shaft and from the latter; internal splines formed in the projecting extremity of said inner tube; a sleeve member adapted to enter said hollow shaft at its one extremity; external splines formed on the other extremity of said sleeve member and meshing with the internal splines of said inner tube; means for detachably locking said sleeve member in said inner tube; means for locking the other extremity of said sleeve member in said shaft; and means for transmitting the rotation of said delivery shaft to said terminal nut.

6. A wrench for removing a nut from the extremity of a tubular shaft comprising: a sleeve member adapted to be inserted in the extremity of said shaft; locking means on said sleeve member adapted to engage said shaft and prevent rotation of said sleeve member therein; an outer tube fitted about said sleeve member and adapted to engage said nut for rotating the latter; power transmission gears; a housing enclosing said gears; means transmitting rotation from said gears to said outer tube for rotating said nut in one direction; means securing said housing to said sleeve member for transmitting the reaction of said gears to said tubular shaft; and means for rotating said gears.

7. A wrench for removing a nut from the extremity of a tubular shaft as described in claim 6 in which the means for rotating said gears comprises a torque indicating wrench operatively connected to said gears.

8. A wrench for removing a nut from the extremity of a tubular shaft as described in claim 6 in which the locking means on said sleeve comprises: a conical core member threaded into said sleeve; locking pins in contact with the conical surface of said core member and projecting radially from said sleeve so that when said core member is threaded into said sleeve, said pins will be forced outwardly into contact with said tubular shaft.

9. A wrench for removing a nut from the extremity of a tubular shaft as described in claim 8 in which the means for transmitting rotation from said gears to said shaft comprises: a hollow delivery shaft driven by said gears; internal splines in said delivery shaft; external splines on said outer tube in engagement with said internal splines so that rotation of said delivery shaft will be transmitted through said outer tube to said nut.

10. A wrench for removing a nut from the extremity of a tubular shaft as described in claim 9 in which the means for securing said housing to said sleeve member comprises: an anchor frame; means securing said anchor frame to said housing; an inner tube fixed to and arising from said anchor frame within said outer tube; and coacting splines on said inner tube and said sleeve member transmitting rotation therebetween.

11. A wrench for removing a nut from the extremity of a tubular shaft as described in claim 10 having means for detachably securing said inner tube to said sleeve member to maintain said splines in mesh.

References Cited in the file of this patent

UNITED STATES PATENTS

| 2,569,509 | Wells | Oct. 2, 1951 |
| 2,606,472 | Curtis et al. | Aug. 12, 1952 |
| 2,712,255 | Able | July 5, 1955 |

FOREIGN PATENTS

| 11,944 | Great Britain | of 1915 |
| 170,321 | Austria | Feb. 11, 1952 |